United States Patent
Lebacher et al.

(10) Patent No.: US 12,554,573 B2
(45) Date of Patent: Feb. 17, 2026

(54) AUTOMATICALLY DETERMINING A ROOT-CAUSE INDICATOR OF A TECHNICAL SYSTEM CONCERNING AN OUTPUT OF A MACHINE LEARNING MODEL

(71) Applicant: Siemens Aktiengesellschaft, Munich (DE)

(72) Inventors: Michael Lebacher, Töging am Inn (DE); Johanna Bronner, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 67 days.

(21) Appl. No.: 18/291,494

(22) PCT Filed: Jul. 28, 2022

(86) PCT No.: PCT/EP2022/071207
§ 371 (c)(1),
(2) Date: Jan. 23, 2024

(87) PCT Pub. No.: WO2023/012029
PCT Pub. Date: Feb. 9, 2023

(65) Prior Publication Data
US 2025/0094266 A1    Mar. 20, 2025

(30) Foreign Application Priority Data
Aug. 4, 2021 (EP) .................... 21189654

(51) Int. Cl.
*G06F 11/00* (2006.01)
*G06F 11/07* (2006.01)

(52) U.S. Cl.
CPC .................. *G06F 11/079* (2013.01)

(58) Field of Classification Search
CPC ...................................................... G06F 11/079
See application file for complete search history.

(56) References Cited

U.S. PATENT DOCUMENTS

2024/0144043 A1*  5/2024  Helterhoff .......... G05B 13/0265

OTHER PUBLICATIONS

PCT International Search Report and Written Opinion of International Searching Authority mailed Nov. 15, 2022 corresponding to PCT International Application No. PCT/EP2022/071207 filed Jul. 28, 2022.

(Continued)

*Primary Examiner* — Philip Guyton
(74) *Attorney, Agent, or Firm* — Schmeiser, Olsen & Watts LLP (57) ABSTRACT

A computer-implemented method is provided for automatically determining a root-cause indicator of a technical system concerning an output of a machine learning model trained to analyze the technical system based on sensor data of different sensors measuring parameters of the technical system, including receiving measured sensor data of the technical system and an output of the machine learning model for the received measured sensor data as input, determining an explanation information for the output of the machine learning model, training a root-cause model based on root-cause labels assigned to the output of the machine learning model to map the set of feature values of the explanation information onto a root-causes indicator, determining one of the root-cause labels by inputting a new set of feature value determined for an output of the machine learning method, and outputting the determined root-cause label as root-cause indicator to a user interface.

14 Claims, 2 Drawing Sheets

(56) References Cited

OTHER PUBLICATIONS

Steenwinckel, Bram et al: "FLAGS: A Methodology for adaptive anomaly detection and root cause analysis on sensor data streams by fusing expert knowledge with machine learning", Future Generation Computer Systems, Elsevier Science Publishers. Amsterdam, NL, vol. 116, Oct. 19, 2020 (Oct. 19, 2020), pp. 30-48, XP086401633.
Brito, Lucas Costa et al: "An Explainable Artificial Intelligence Approach for Unsupervised Fault Detection and Diagnosis in Rotating Machinery"; arxiv.org, Cornell University Library, 201 Olin Library Cornell University Ithaca, NY 14853; Feb. 23, 2021 (Feb. 23, 2021), XP081891018.

* cited by examiner

AUTOMATICALLY DETERMINING A ROOT-CAUSE INDICATOR OF A TECHNICAL SYSTEM CONCERNING AN OUTPUT OF A MACHINE LEARNING MODEL

CROSS-REFERENCE TO RELATED APPLICATIONS

This application claims priority to PCT Application No. PCT/EP2022/071207, having a filing date of Jul. 28, 2022, which claims priority to European Application No. 21189654.3, having a filing date of Aug. 4, 2021, the entire contents both of which are hereby incorporated by reference.

FIELD OF TECHNOLOGY

The following relates to an assistance apparatus and a computer-implemented method for automatically determining a root-cause indicator of a technical system concerning an output of a machine learning model trained to analyze the technical system based on sensor data of different sensors measuring parameters describing the technical system, especially physical parameters.

BACKGROUND

Nowadays, in industrial manufacturing operation monitoring and quality monitoring are performed by data-driven applications, like anomaly detection or classification of quality, based on machine learning models. Sensors are omnipresent in all kinds of heavy machinery and equipment. Sensors are to be understood not only to measure parameter, but also to take visual information, e.g., take a picture or video, e.g., of a workpiece in a manufacturing process. Another important application field of sensors is monitoring the functionality of heavy machinery such as pumps, turbines, die casting machines, mills etc. To do so, sensors are installed on these devices and machines and measure different physical parameters such as electrical current, temperature, pressure over time which enables monitoring the state of the system as a whole. If the machinery is subject to different damages, the sensor data values typically show unusual, suspicious patterns and anomalies in the data which allow to train machine learning models for detecting these anomalies.

However, there are multiple problems related to detecting anomalies and subsequently failures of the machine from sensor data. Since the status of a machine often depends on various physical parameters and especially depends on combinations of specific parameters, the machine learning model is of complex structure because it has to be trained taking into account several time series of sensor data representing all of the various parameters. Such learned machine learning (IL) models are called black-box models and are the "logic" behind the provided result is often extremely hard to explain and can hardly be understood even by data scientists and AI experts. This means that it is not possible to understand globally how sensor data are processed by the machine learning model, and to understand locally how the machine learning model behaves, e.g., how a certain prediction based on a specific input was made by the machine learning model.

In productive use, this is a major problem. It is often of critical importance to obtain human-understandable explanation of the underlying physical root-cause of an anomaly detected by the ML model to be able to take counter measures at the machine or to decide on how to react on such anomalies. However, this information is most often not available while constructing and training the model since not all possible states of physical behaviour that lead to failure are included in the training datasets and become obvious only once employed in the field. Therefore, up to now the root-cause investigation is a labour-intensive manual work that needs to be done again and again in each case where an anomaly arises. This is required not only for anomaly detection but also for any other output of a machine learning model, independent whether based on classification or regression models, which is trained to evaluate a machine or other technical system.

Model-agnostic approaches from interpretable machine learning (IML) and explainable artificial intelligence (XAI) are known which provide some information concerning the decision path of the machine learning model depending on the input sensor data. However, they provide only limited and abstract information which is understandable for a Data Scientist or a Machine Learning Engineer, that can interpret the XAI or IML method but are lacking information and knowledge about physical root causes.

STEENWINCKEL BRAM ET AL: "FLAGS: A methodology for adaptive anomaly detection and root cause analysis on sensor data streams by fusing expert knowledge with machine learning", FUTURE GENERATION COMPUTER SYSTEMS, ELSEVIER SCIENCE PUBLISHERS. AMSTERDAM, NL, vol. 116, 19 Oct. 2020 (2020-10-19), pages 30-48, XP086401633, ISSN: 0167-739X, DOI: 10.1016/J.FUTURE.2020.10.015 discloses a Fused-AI interpretable anomaly generation system which incorporate semantic knowledge in a machine learning technique to enhance expressivity.

LUCAS COSTA BRITO ET AL: "An Explainable Artificial Intelligence Approach for Unsupervised Fault Detection and Diagnosis in Rotating Machinery", ARXIV.ORG, CORNELL UNIVERSITY LIBRARY, 201 OLIN LIBRARY CORNELL UNIVERSITY ITHACA, NY 14853, 23 Feb. 2021 (2021-02-23), XP081891018) discloses an explainable artificial intelligence approach for unsupervised fault detection. In a first part vibration features in the time and frequency domains are extracted. Secondly, in the fault detection, the presence of fault is verified in an unsupervised manner based on anomaly detection algorithms. Finally, Shapley Additive Explanations (SHAP), a technique to interpret black-box models, is used in fault diagnosis.

SUMMARY

An aspect relates to an assistance apparatus and method that provides physical reasons, so called root-causes, for an anomaly or other output of a machine learning models used to evaluate and monitor a machine or device. A further aspect is to provide a solution that is consistent with the underlying anomaly or in general ML model, customable to new root-cases for anomalies, applicable in an on-line setting where the machine or device is continuously monitored by a ML model based on currently measured sensor data and explanations are required sequentially for output of the ML model.

A first aspect concerns a computer-implemented method for automatically determining a root-cause indicator of a technical system concerning an output of a machine learning model trained to analyze the technical system based on sensor data of different sensors measuring parameters of the technical system, comprising receiving measured sensor data of the technical system and an output of the machine learning model (f) for the received measured sensor data as input, wherein the machine learning model is used to evaluate the technical system, determining an explanation information for the output of the machine learning model, comprising a set of feature values with one feature value for each single component and/or each combination of components of the sensor data of the technical system indicating an impact of the feature on the output of the machine learning model, training a root-cause model based on root-cause labels assigned to the output of the machine learning model to map the feature values of the explanation information onto a root-causes indicator, determining one of the root-cause labels by inputting a new set of feature value determined for an output of the machine learning model resulting from inputting a new measured sensor data into the root-cause model, and outputting the determined root-cause label as root-cause indicator to a user interface.

The received sensor data can be any kind of data detected at the technical system. The measured sensor data can be structured in one of various formats, e.g., as tabular data, time series of several sensor data, i.e., multivariate time series, images, and further. Such, it is applicable for a wide range of evaluation tasks and a wide range of technical systems to be evaluated. The machine learning model is trained with sensor data representing technical parameters of the technical system. The proposed solution is very generic and not limited to the usage of the machine learning model for anomaly detection but also works in general for machine learning models used to evaluate the technical system based on the measured sensor data, e.g., quality evaluation. The root-cause model is trained to map the feature values of the explanation information onto a root-cause indicator. This provides an efficiency in terms of processing requirements since the explanation information and its feature values are often of lower dimension as the measured sensor data or at least sparse. Furthermore, the relevant information of the machine learning model is already highlighted and extracted. The trained root-cause model can be applied to the output of new measured sensor data and can be operated online with the technical system.

According to embodiments of the invention the root-cause indicator indicates a physical root-cause of the output of the machine learning model in the technical system and/or a measure to be applied onto the technical system The technical system is a device or machine in industrial manufacturing or heavy machinery.

This enables the method to be applied to a wide range of evaluation scenarios of the technical system and technical systems as such. It allows instant reaction on a specific output of the machine learning model, e.g., on a reported anomaly, and therefore reduces damage or down-time of the technical system.

In an embodiment of the method, the machine learning model is any of a supervised classification model or regression model or an unsupervised classification model or regression model.

The proposed solution is very generic and not limited to a specific type of machine learning model. It can be applied for a wide range of machine learning applications.

In an embodiment of the method, the explanation information is determined by an explainable artificial intelligence model.

Existing explanation artificial models from the toolset of Explainable AI (XAI) or Interpretable Machine Learning (IML) can be reused, which reduces development effort to setup the method. Further available explanation information models are optimized to explain different machine learning models, which allows the method to be easily optimized to different machine learning models.

In an embodiment of the method, the explainable artificial intelligence model is configured such that the feature values vary for different sensor data.

Varying feature values for different sensor data ensures that the explainable artificial intelligence model provides sufficient distinction between different instances of measured sensor data.

In an embodiment of the method, the root-cause labels assigned to the output of the machine learning model are based on set of feature values of the explanation information determined for the output of the machine learning model.

This ensures generality, since it is only required to find a root-cause model for the feature values of the explanation information but not for the raw data, i.e., the measured sensor data.

Further, this ensures consistency with the machine learning model evaluating the technical system, since the spurious patterns that led to the explanations are obtained via the explanation information directly from the machine learning model.

In an embodiment of the method, the specific root-cause labels are assigned by a domain expert of the technical system.

This provides flexible adaption of the method and especially the root-cause labels to different types of technical systems, different physical parameters represented by the measured sensor data and different evaluation applications for the technical system. The domain expert, e.g., a design engineer or an operator of the technical system, has profound knowledge of the technical system its physical parameters. Therefore, the technical expert can provide the most adequate label and also most adequate measures to be executed to resolve the cause for the anomaly or other output of the machine learning algorithm. Further, the assignment of the specific root-cause labels by a domain expert ensures that the root-cause model is consistent to the machine learning model providing the output which is labelled in the training phase.

In an embodiment of the method, at least a minimum number of specific root-cause labels are defined during the training the root-cause model.

The minimum number of root-causes controls the number of iterations performed to train the root-cause model before it is applied on productive operation, i.e., evaluating current measured sensor data and outputting an evaluation result, which can be a "normal" or "anormal" or a probability or score for a being in a specific state or similar. Therefore, the training of the root-cause model can be adapted to cover at least a minimum number of specific root-causes which may apply for the evaluated technical system. It allows to control the required time and number of measured sensor data required for training. The specific root-cause labels are assigned to the output of the machine learning model when processing the received measured sensor data during training of the root-cause model. The root-cause labels are assigned by a domain expert.

In an embodiment of the method, a set of specific root-cause labels is predefined and one of the specific root-cause labels is assigned to the output of the machine learning model of the received measured sensor data.

The training of the root-cause model can be adapted to cover all known or potential root-causes which apply for the evaluated technical system and ensures therefore that at least these set of specific root-causes will be identified.

In an embodiment of the method, an "unknown" root-cause label indicating an unknown root-cause is assigned to such output of the machine learning model where no other root-cause label was assigned.

The "unknown" root-cause label ensures that the root-cause model outputs a label for each input.

In an embodiment of the method, for the new measured sensor data the "unknow" root-cause is output as root-cause indicator to the user interface if the root-cause model determines one of a specific root-cause label and a probability of the determined root-cause label is below a pre-defined threshold value and/or the determined root-cause label is the "unknown" root-cause label.

This ensures that each output of the machine learning model will get a root-cause label which can be 'unknown' if there is not enough evidence that a given specific root-cause label fits the explanation pattern as encoded in the set of feature values of the explanation information. Else it will classify similar explanation patterns, i.e., set of feature values, into the same category.

In an embodiment of the method, the accuracy of the root-cause model is evaluated by separating the received output of the machine learning model into a training set used for training the root-cause model and a test set used for determining the accuracy of the root-cause model.

In more detail, a tuple is created for each output of the machine learning model consisting of a set of feature values determined for this output and the corresponding assigned root-cause label. The expression "explanation pattern" is used in the following as a synonym for "set of feature values" to facilitate reading. The tuples for all or at least a subset of all received output of the machine learning model are separated into a subset of training tuples and a subset of test tuples. The training tuples are used to train the root-cause model. For testing the root-cause model, the explanation pattern of each of the test tuples is input into the trained root-cause model. An accuracy measure is determined by comparing the corresponding output of the root-cause model, i.e., the output root-cause labels with the root-cause labels of the tuples. The accuracy measure provides an indication, e.g., a probability how close the output of the root-cause model comes root-cause labels of the tuples.

In an embodiment of the method, the root-cause model is re-trained with additional root-cause labels assigned to output of the machine learning model of new measured sensor data.

This ensures a continuous improvement of the trained root-cause model and an adaption of the trained root-cause model to newly occurring error type or root-causes determined.

A second aspect concerns an assistance apparatus for automatically determining a root-cause indicator of a technical system concerning an output of a machine learning model trained to analyze the technical system based on sensor data of different sensors measuring parameters of the technical system, comprising at least one processor configured to receive measured sensor data of the technical system and an output of the machine learning model for the received measured sensor data as input, wherein the machine learning model is used to evaluate the technical system, determine an explanation information for the output of the machine learning model, comprising a set of feature values with one feature value for each single component and/or each combination of components of the sensor data of the technical system indicating an impact of the feature on the output of the machine learning model, train a root-cause model (q) based on root-cause labels assigned to the output of the machine learning model (f) to map the feature values (0) of the explanation information onto a root-causes indicator (L), determine one of the root-cause labels by inputting a new set of feature value (0) determined for an output of the machine learning method resulting from inputting a new measured sensor data into the root-cause model (q), and output the determined root-cause label as root-cause indicator to a user interface, wherein the root-cause indicator indicates a physical root-cause of the output of the machine learning model in the technical system and/or a measure to be applied onto the technical system, and wherein the technical system is a device or machine in industrial manufacturing or heavy machinery.

The assistance apparatus provides the ability to learn physical explanations, encoded as labels, on the output of any suitable explanation information determined by applying any explainable AI(XAI/IML) method, thereby exploiting the information compression of these methods. The assistance apparatus is configured such that the root-cause model is trained to map each set of feature values of the explanation information onto a root-cause label. This provides an efficiency in terms of processing requirements since the explanation information and the set of feature values, i.e., the explanation patterns are often of lower dimension as the measured sensor data or at least sparse. Furthermore, the relevant information of the machine learning model is already highlighted and extracted by the explanation pattern. The assistance apparatus requires reduced processing capacity.

A third aspect concerns a computer program product (non-transitory computer readable storage medium having instructions, which when executed by a processor, perform actions) directly loadable into the internal memory of a digital computer, comprising software code portions for performing the steps as described before, when the product is run on the digital computer.

BRIEF DESCRIPTION

Some of the embodiments will be described in detail, with references to the following Figures, wherein like designations denote like members, wherein.

DETAILED DESCRIPTION

It is noted that in the following detailed description of embodiments, the accompanying drawings are only schematic, and the illustrated elements are not necessarily shown to scale. Rather, the drawings are intended to illustrate functions and the co-operation of components. Here, it is to be understood that any connection or coupling of functional blocks, devices, components or other physical or functional elements could also be implemented by an indirect connection or coupling, e.g., via one or more intermediate elements. A connection or a coupling of elements or components or nodes can for example be implemented by a wire-based, a wireless connection and/or a combination of a wire-based and a wireless connection. Functional units can be implemented by dedicated hardware, e.g., processor, firmware or by software, and/or by a combination of dedicated hardware and firmware and software. It is further noted that each functional unit described for an apparatus can perform a functional step of the related method and vice versa.

Sensors are omnipresent in all kinds of technical systems, like manufacturing devices, equipment in distribution systems and heavy machinery. One especially important application field of sensors is monitoring the functionality of heavy machinery such as pumps, turbines, die casting machines etc. Sensors are installed on these technical systems and measure different physical parameters such as current, temperature, pressure mainly over time providing for each of the different sensors measured sensor data, e.g., time series of measured sensor data, which enables monitoring of the state of the technical system as a whole. If the technical system is subject to different damages, the measured sensor data values typically show suspicious patterns and anomalies in the sensor data which allow to train machine learning algorithms for detecting these anomalies. Often several different parameters are monitored at the same time, having complex data structure and even more complex interrelations the learned machine learning model is complex, often called black-box algorithms. Subsequently the output of the trained machine learning model is hardly interpretable.

In operative use, i.e., when a machine learning model is applied for evaluation a technical system like a press, pump, manufacturing device, an operator of the technical system does not only want to know that the technical system is in an anormal state or the quality of the manufactured product is of low quality, but also needs to know the reason, i.e., the root-cause for the state or quality and/or how to react in this case. The proposed method provides not only an interpretation of the machine learning model on a global basis, i.e., how the machine learning model itself processes sensor data in general, or on a local basis, i.e., how was a certain prediction made, but it automatically provides an underlying root-cause in the technical system and/or or instructions for countermeasures the operator shall perform on the technical system or its environment.

Figure 1:
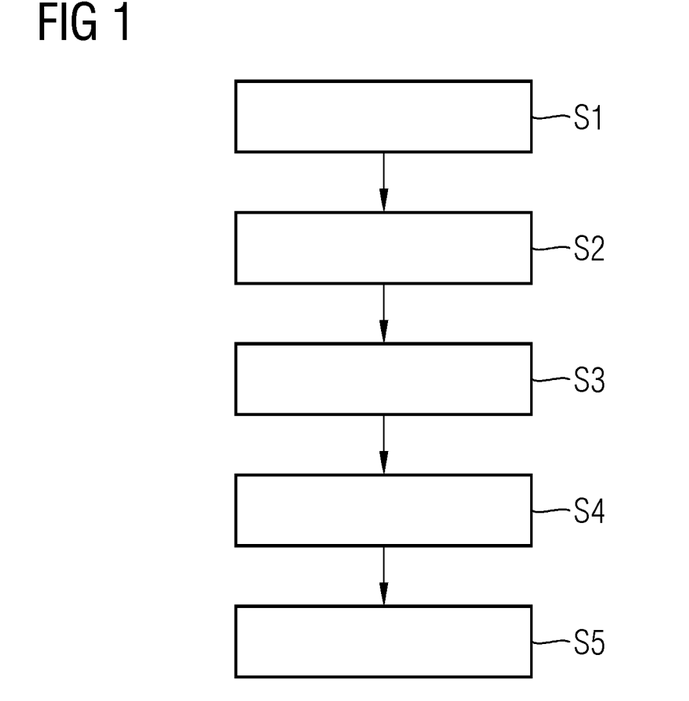
FIG. 1 schematically illustrates an embodiment of the inventive computer-implemented method by a flow diagram.

The computer-implemented method for automatically determining a root-cause indicator of a technical system concerning an output of a machine learning model is described in detail based on FIG. 1 which illustrates an embodiment of the inventive method by a flow diagram.

In a first step S1, measured sensor data of the technical system and an output of the machine learning model which results from processing the received measured sensor data as input are received. The machine learning model is trained to evaluate the technical system, e.g., with respect to operating in a normal or anormal mode, based on sensor data measuring physical parameters of the technical system. In an embodiment of the method, the machine learning model is received, and the output of the machine learning model is generated as part of the method, by processing the machine learning model with the received measured sensor data as input. The machine learning model is any of a supervised classification model or regression model or an unsupervised classification model or regression model.

Subsequently an explanation information for the output of the machine learning model is determined comprising a set of feature values with one feature value for each single component and/or one feature value for each combination of components of the sensor data of the technical system indicating an impact of the feature on the output of the machine learning model, see step S2. In an embodiment, the explanation information is determined by an explainable artificial intelligence (XAI) model. The explainable artificial intelligence model is configured such that the feature values ($\theta$) vary for different sensor data.

As an example of the set of feature values also called explanation pattern, we assume that the measured sensor data comprise of three sensor data values measured at a certain time from three different sensors. Each of the different sensor data values is a component of the measured sensor data. The explanation information will provide three feature values indicating the contribution from each single component and further three feature values for each combination of two different components. This depth of explanation information is sufficient for most of the cases. In some embodiments, the explanation information can be determined including a feature value indicating the influence of combinations of all three components of the measured sensor data.

In step S3, a root-cause model is trained based on root-cause labels assigned to the output of the machine learning model to map the set of feature values of the explanation information onto a root-causes indicator. The root-cause labels assigned to the output of the machine learning model are based on the set of feature values of the explanation information determined for the output of the machine learning model. The root-cause labels are assigned by a domain expert of the technical system, i.e., when the output of the machine learning model is analyzed and a root-cause could be determined by the domain expert, the determined root-cause is assigned to the set of feature values determined for the respective output of the machine learning model at that certain measured sensor data used as input. The domain expert can be an experienced operator or a design engineer of the technical system or a simulation engineer, which derived the root-cause by a simulating the technical system for the input measured sensor data.

As an alternative a set of specific root-cause labels is predefined and the training is continued until at least one of the specific root-cause labels is assigned to an output of the machine learning model of the received measured sensor data, which is analyzed. For example, there are known specific root-causes which have occurred already and lead to a certain state of the technical machine which relates to a certain output of the machine learning model.

To ensure a minimum scope for the root-cause model at least a minimum number of different specific root-cause labels have to be defined during the training the root-cause model. The training phase for the root-cause model is continued until this minimum number of different root-cause labels could be assigned. The resulting root-cause model is applied in operative use, i.e., to determining one of the root-cause labels by inputting a new set of feature value determined for an output of the machine learning method resulting from inputting a new measured sensor data into the root-cause model, see step S4 and output the root-cause label as a root-cause indication to an output interface, see step S5.

Figure 2:
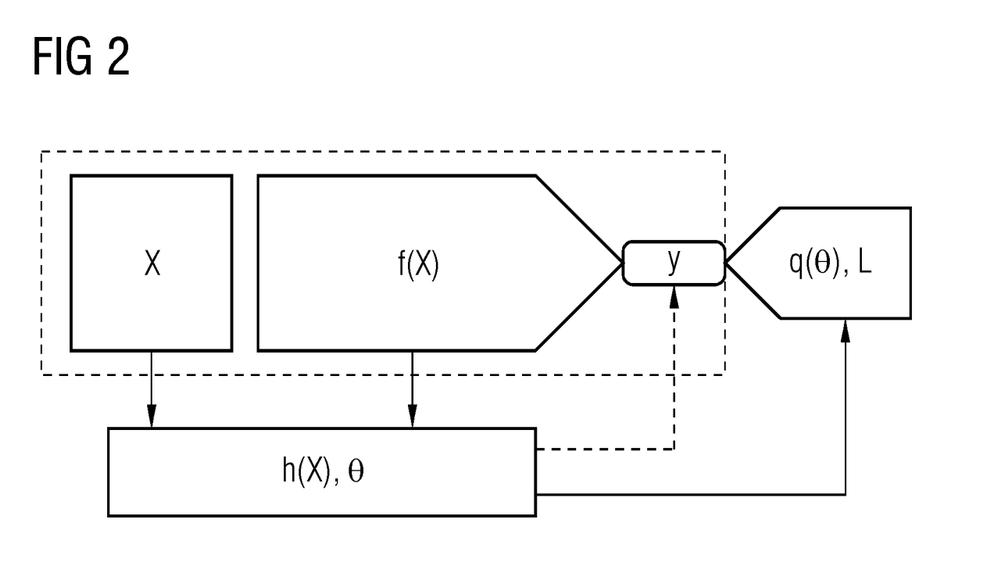
FIG. 2 schematically illustrates in more detail an interaction of the various processing steps.

The underlying data and models of the method are described in more detail based on FIG. 2.

The received sensor data xi is assumed to be structured as a data matrix $$X = (x_1, \ldots, x_n)$$

of dimension (n×k), comprising n sensor data each sensor data comprising k components. Further, an evaluation machine learning model f(•) used to evaluate the technical model is assumed to be trained that outputs a probability for a failure or a failure label. The evaluation machine model is the machine learning model which provides the output to which the root-cause label is determined and assigned. In case of outputting the failure label $$f(x_i) = \text{'failure'}$$

or $$f(x_i) = \text{'no failure'}.$$

Else, in case a probability or score is outputted $$f(x_i) = P(\text{'failure'})$$

and $$P(\text{'no failure'}) = 1 - f(x_i)$$

in case of a probability and a similar formulation in case of a score.

Since the method outlined here is model agnostic, there are no restrictions concerning any classifier model or regression model and the machine learning model f(•) can be a Deep Neural Network, which is a supervised approach, an Isolation Forest, i.e., an unsupervised approach, or any other suitable model that outputs a predicted failure label or a method that outputs an anomaly score or an anomaly probability. Hence, any evaluation machine learning model for evaluating the technical system can be chosen. In an embodiment, the evaluation machine learning model is robust and provides a high performance with respect to the input sensor data.

After training and optimizing f(•), there is typically following situation: A domain expert who does not have necessarily competencies in interpreting or understanding the output of f($x_i$). Therefore, methods from the toolset of Explainable AI (XAI) or Interpretable Machine Learning (IML) are applied to provide an explanation information.

In order to improve on these aspects model-agnostic algorithms, i.e., these approaches work with any Black-Box model, have been developed to achieve local interpretability. Those explanation models providing an explanation information include a local surrogate model (LIME), a simple local approximation of the complicated model, Partial Dependence Plots, showing the partial influence of selected features on the output, permutation feature importance showing the partial importance of selected features and SHAP (SHapley Additive exPlanations) providing simple and additive explanations for local instances. While those models are intended to explain the behavior of the underlying model, they typically are not intended to provide customizable learned explanations.

Those model-agnostic methods explain the output of f($x_i$) in terms of coefficients θ. These "coefficients θ" are synonymously called "set of feature values" or "explanation pattern" in this document. These might be measures like instance-specific feature importance or additive methods, e.g., LIME or SHAP that come in additive form:

$$h(X, f(x_i)) = \sum_j \theta_{i,j} x_{i,j} + \sum_{p<q} \theta_{i,q,p} x_{i,p} x_{i,q} \approx f(x_i)$$

wherein h(X, f($x_i$)) is an explanation information

In general, one of the explanation algorithms, i.e., information like LIME, SHAP, Partial Dependence Plots, Surrogate Models, ALE, Saliency Methods can be chosen by preferences, it is only required that the explanation patterns are encoded in coefficients $\theta_i$ that vary with the instances i.

Hence, the coefficients $\theta_{i,j}$ ($\theta_{i,p,q}$) carry some information about the impact of feature j (or the combined impact of features p and q) on the output f($x_i$). While this information might be highly relevant for a data scientist or a machine learning expert it is mostly not for the domain expert who might want to obtain his explanations rather in categories or root-cause indicators L, e.g., a label set like {'severe failure', 'error with pressure', . . . } or even should lead directly to concrete decisions/actions like

{'stop machine', 'check lubricant', . . . }.

However, these labels are not provided beforehand and are typically found only once concrete outcomes of the machine learning model f($x_i$) are inspected and explanation information h(X, f($x_i$)) are evaluated. The labeling of the explanation information is based on the coefficients $\theta_i$ outputted by h(X, f($x_i$)) because this ensures generality, since it is only required to find a model for the coefficients θ and not the raw data, i.e., the received sensor data X. It ensures consistency, since the spurious explanation patterns that lead to the root-cause labels are obtained via h(X, f($x_i$)) directly from the machine learning model f($x_i$). It further ensures efficiency o, since θ is often of lower dimensionality as $x_i$ or at least sparse. Furthermore, the relevant explanation information is already highlighted by h(X, f($x_i$)).

Hence, it is proposed to train a root-cause model q($\theta_i$, f($x_i$)) that learns a relation between the explanation pattern i.e., a set of coefficients θ and a user-defined root-cause label L. The root-cause model q(•) can be in principle any suitable classifier algorithm that outputs a probability score for each predicted label to and is able to deal with multiple different sensors.

To do so, we propose the following algorithm:
1. Define the minimum number of root-cause labels $l_{min}$ and set l=0, define a threshold=c as cutoff-probability to output a label. In some embodiments, a set of possible root-cause labels L can be pre-defined.
2. While l<$l_{min}$
   a. Add root-cause labels $L_i$ to outcomes of f($x_i$) based on θ to create tuples ($L_i$, $\theta_i$) containing set of feature values θ and an assigned of root-cause label
   b. Save the index i in I
   c. l←l+1 (increment l to l+1)
3. Set all $L_i$ where no tuple exists to the category 'unknown': ($L_i$, $\theta_i$)=('unknown', $\theta_i$)∀i∉I
4. Learn q($\theta_i$, $L_i$), being a mapping from $\theta_i$ to $L_i$
5. If P($L_i$=L)<c and $L_i$≠'unknown' output 'unknown', else output q($\theta_i$, f($x_i$))

The algorithm above ensures that each output of the underlying machine learning model $f(x_i)$ will get a root-cause label $L_i$ which can be 'unknown' if there is not enough evidence that a given root-cause label fits the explanation pattern as encoded in the coefficients $\theta$. Else it will classify similar explanation patterns into the same category. This allows for example to cluster observations that have not yet been labelled manually into different explanation categories. It also allows to relate physical root-causes via the labels to the output of the underlying algorithm $f(x_i)$. The determined root-cause labels are output as root-cause indicator L.

To evaluate the performance of the root-cause model a training and a test set is build based on the labeled tuples ($L_i$, $\theta_i$) and to train the root-cause model on the train set and evaluate the root-cause model on the test set. If the chosen root-cause model $q(\theta_i, f(x_i))$ is one of an interpretable model, e.g., an intrinsically interpretable model, there is even a possibility to investigate which explanation patterns lead to which root-cause label. Alternatively, the root-cause model could be approximated by an intrinsically explainable mode.

To use this approach in an on-line setting, e.g., in an operative environment of a pump or a press as the technical system, new sensor data and optionally additional information is captured, e.g., using algorithms like Learn++. This ensures that the root-cause model is able to deal with high amounts of complex sensor data.

For new measured sensor data, the "unknow" root-cause is output to the user interface if the root-cause model determines one of a specific root-cause labels and a probability of the determined root-cause label is below the predefined threshold c and/or the determined root-cause label is the "unknown" root-cause label.

In some embodiments, the root-cause model is re-trained with additional root-cause labels assigned to output of the machine learning model of new measured sensor data.

Figure 3:
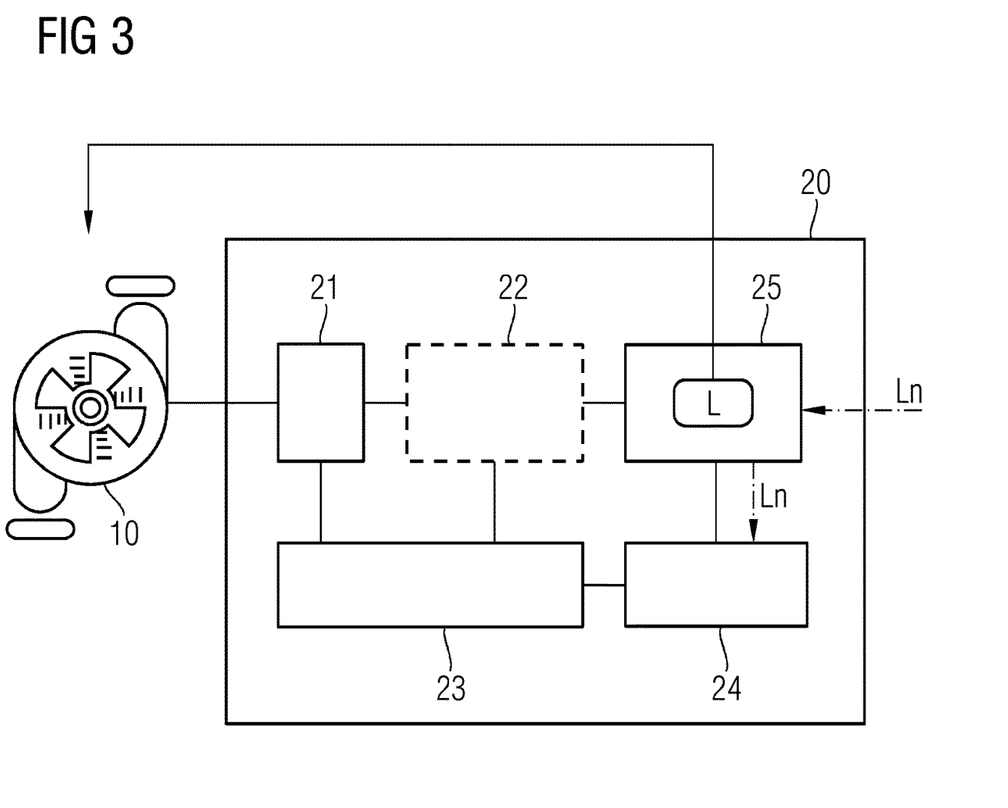
FIG. 3 schematically illustrates an embodiment of the inventive assistance apparatus in form of a block diagram.

FIG. 3 shows an embodiment of the assistance apparatus 20 for automatically determining a root-cause indicator of a technical system 10 concerning an output of the machine learning model f.

The technical system 10 can be any type of device or machinery with sensors applied to measure physical parameters of the technical system or derive parameters characterizing the operating state of the technical system. The measured sensor data can comprise data of different sensors measured at the same time or during period of time.

The assistance apparatus 20 comprises an input interface 21 configured to receive measured sensor data x of the technical system 10 and an output of the machine learning model f for the received measured sensor data. In some embodiments, the assistance apparatus comprises an evaluation unit 22, which is configured to implement and process the machine learning model f Such, the machine learning model is available in the assistance apparatus 20 and the output of the machine learning model is processed internally by inputting the received measured sensor data to the evaluation unit 22.

The assistance apparatus 20 comprises an explanation unit 23 configured to determine the explanation information h for the output of the machine learning model and a set of feature values $\theta$ with one feature value for each single component and/or each combination of components of the sensor data of the technical system indicating an impact of the feature on the output of the machine learning model. The determined set of feature values $\theta$ is passed to a root-cause unit 24. The root-cause unit 24 is configured to train a root-cause model q based on root-cause labels assigned to the received output of the machine learning model to map the set of feature values $\theta$ of the explanation information h onto a root-causes indicator L. The training of the root-cause model q is finalized when a minimum number of root-cause labels are assigned to output of the machine learning model with received sensor data, e.g., of a training set.

Subsequently the assistance apparatus can be applied to determine a root-cause indicator L for new measured sensor data of the technical system, which means the assistance apparatus is in operative use. The determined root-cause indicator L is output via output unit 25, which is, e.g., constructed as a user interface providing the root-cause indicator L. The root-cause indicator L can be provided on a display of the output unit 25 in form of a string output or visualized as part of a graphical representation of the technical system 10 on the display or as and audio output.

The output interface 25 is configured to receive an input, e.g., labels assigned to an output of the machine learning model by a user, e.g., the domain expert during training phase. An input, especially a new root-cause label Ln can be received by the output interface 25 during operative use of the assistance apparatus 20 from the domain expert, to input a newly determined root-cause related to an output of the machine learning model. The new root-cause label Ln is forwarded to the root-cause unit 24 and the root-cause model is re-trained taking into account this new label Ln.

Although the present embodiment has been disclosed in the form of embodiments and variations thereon, it will be understood that numerous additional modifications and variations could be made thereto without departing from the scope of the embodiment.

For the sake of clarity, it is to be understood that the use of "a" or "an" throughout this application does not exclude a plurality, and "comprising" does not exclude other steps or elements.

The invention claimed is:

1. A computer-implemented method for automatically determining a root-cause indicator of a technical system concerning an output of a machine learning model trained to analyze the technical system based on sensor data of different sensors measuring parameters of the technical system, the method comprising:
receiving measured sensor data of the technical system and an output of the machine learning model for the measured sensor data as input, wherein the machine learning model is used to evaluate the technical system;
determining an explanation information for the output of the machine learning model, comprising a set of feature values indicating an impact of the feature on the output of the machine learning model;
training a root-cause model based on root-cause labels assigned to the output of the machine learning model to map the set of feature values of the explanation information onto a root-causes indicator;
determining one of the root-cause labels by inputting a new set of feature values determined for an output of the machine learning method resulting from inputting a new measured sensor data into the root-cause model; and
outputting the determined root-cause label as root-cause indicator to a user interface, wherein the root-cause indicator indicates a physical root-cause of the output of the machine learning model in the technical system and/or a measure to be applied onto the technical system, and wherein the technical system is a device or machine in industrial manufacturing or heavy machinery.

2. The method according to claim 1, wherein the machine learning model is any of a supervised classification model or regression model or an unsupervised classification model or regression model.

3. The method according to claim 1, wherein the explanation information is determined by an explainable artificial intelligence model.

4. The method according to claim 3, wherein the explainable artificial intelligence model is configured such that the feature values vary for different sensor data.

5. The method according to claim 1, wherein the root-cause labels assigned to the output of the machine learning model are based on the set of feature values of the explanation information determined for the output of the machine learning model.

6. The method according to claim 5, wherein the root-cause labels are assigned by a domain expert of the technical system.

7. The method according to claim 1, wherein at least a minimum number of different specific root-cause labels are defined during the training the root-cause model.

8. The method according to claim 1, wherein a set of specific root-cause labels is predefined and one of the specific root-cause labels is assigned to the output of the machine learning model of the received measured sensor data.

9. The method according to claim 7, wherein
an unknown root-cause label indicating an unknown root-cause is assigned to the output of the machine learning model where no other root-cause label was assigned.

10. The method according to claim 9, wherein for new measured sensor data, the unknown root-cause is output to the user interface if the root-cause model determines one of a specific root-cause label and a probability of the determined root-cause label is below a predefined threshold and/or the determined root-cause label is the unknown root-cause label.

11. The method according to claim 1, wherein an accuracy of the root-cause model is evaluated by separating the received output of the machine learning model into a training set used for training the root-cause model and a test set used for determining the accuracy of the root-cause model.

12. The method according to claim 1, wherein the root-cause model is re-trained with additional root-cause labels assigned to output of the machine learning model of new measured sensor data.

13. An assistance apparatus for automatically determining a root-cause indicator of a technical system concerning an output of a machine learning model trained to analyze the technical system based on sensor data of different sensors measuring parameters of the technical system, comprising:
at least one processor configured to:
receive measured sensor data of the technical system and an output of the machine learning model for the measured sensor data as input, wherein the machine learning model is used to evaluate the technical system;
determine an explanation information for the output of the machine learning model, comprising a set of feature values with one feature value indicating an impact of the feature on the output of the machine learning model;
train a root-cause model based on root-cause labels assigned to the received output of the machine learning model to map the set of feature values of the explanation information onto a root-causes indicator;
determine one of the root-cause labels by inputting a new set of feature values determined for an output of the machine learning resulting from inputting a new measured sensor data into the root-cause model; and
output the determined root-cause label as root-cause indicator to a user interface, wherein the root-cause indicator indicates a physical root-cause of the output of the machine learning model in the technical system and/or a measure to be applied onto the technical system and wherein the technical system is a device or machine in industrial manufacturing or heavy machinery.

14. A computer program product, comprising a computer readable hardware storage device having computer readable program code stored therein, the program code executable by a processor of a computer system to implement a method of claim 1 when the product is run on the digital computer.

* * * * *